H. STOMMEL.
PNEUMATIC TIRE NIPPLE.
APPLICATION FILED AUG. 9, 1919.
1,376,048.
Patented Apr. 26, 1921.
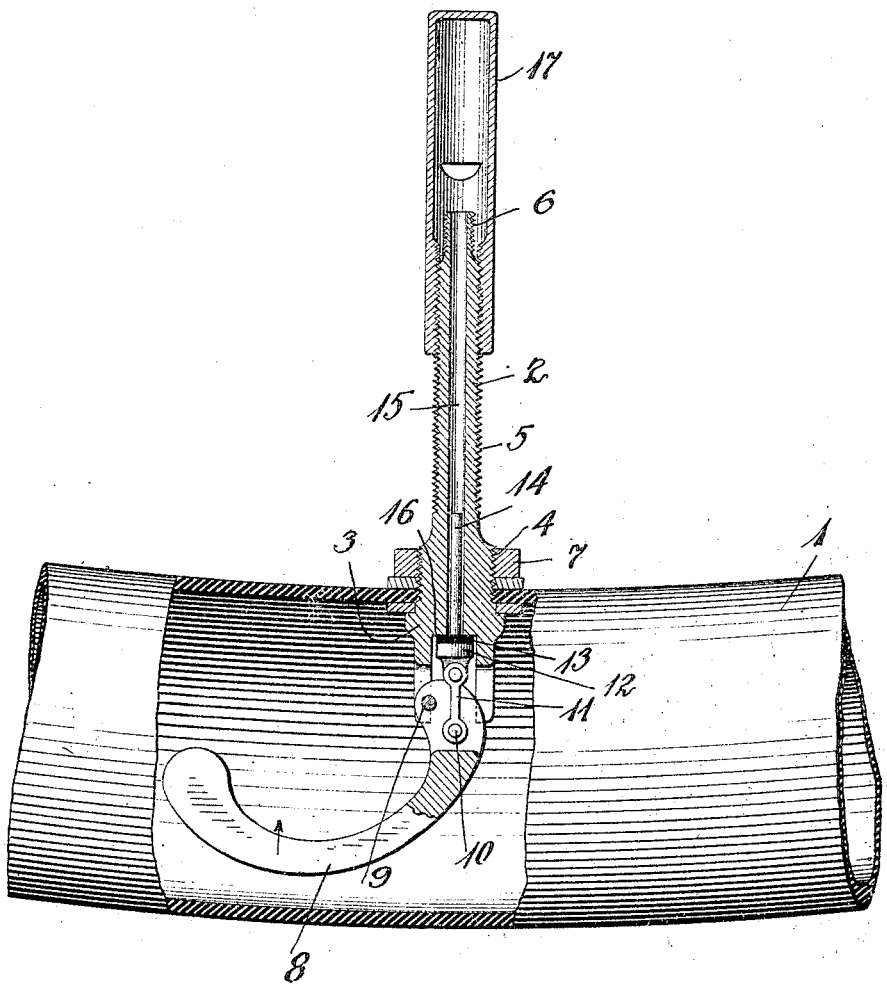
Inventor
Hugo Stommel.
By His Attorney
Jas. H. Griffin.

UNITED STATES PATENT OFFICE.

HUGO STOMMEL, OF METUCHEN, NEW JERSEY, ASSIGNOR OF ONE-HALF TO HARRY RAYMOND, OF METUCHEN, NEW JERSEY.

PNEUMATIC-TIRE NIPPLE.

1,376,048.	Specification of Letters Patent.	Patented Apr. 26, 1921.

Application filed August 9, 1919.   Serial No. 316,462.

*To all whom it may concern:*

Be it known that I, HUGO STOMMEL, a citizen of the United States, residing in Metuchen, county of Middlesex, and State of New Jersey, have invented a certain new and useful Pneumatic-Tire Nipple, of which the following is a specification.

The object of this invention is to provide a pneumatic tire with means operable when the tire becomes punctured or otherwise partially deflated, while the car is passing along a road to audibly notify the occupants of such car so that they will not run along for a distance on a flat tire.

It frequently occurs, that an automobile tire will pick up a tack, nail or become otherwise punctured in such a manner as to produce a relatively slow leak. The tire which is punctured becomes slowly deflated, and so gradual is this operation that it is not noticeable until the car is riding on the rim. This is particularly the case when the slow leak is in the rear tire. It only requires a short time for a rim to cut a shoe so badly, as when a tire is soft, to render the shoe susceptible to blow outs, and it is accordingly desirable to know that as soon as the tire begins to deflate that the driver of the car may stop the vehicle, jack it up and repair or change the tire before the damage becomes irreparable.

The present invention provides means whereby an appreciable softening or deflation of the tire will cause the audible alarm to be given whereby the occupants of the car hearing the alarm will know that one of the tires is softer than it should be and will immediately investigate.

Features of the invention, other than those specified, will be apparent from the hereinafter detailed description taken in conjunction with the accompanying drawings.

In the accompanying drawing, I have illustrated one practical embodiment of the invention, but the construction therein shown is to be understood as illustrative only, and not as defining the limits of the invention.

The drawing shows a fragment of an inner tube of a pneumatic tire, partly in section, equipped with the present invention.

Referring to the drawing I designates an inner tube of a pneumatic tire of the style ordinarily employed in conjunction with an automobile tire shoe.

2 indicates a tire nipple by means of which the tire is inflated. The nipple 2 is provided with a head 3 and the shank of such nipple is stepped down to provide successively smaller threaded portions 4, 5 and 6. The nipple is secured to the inner tube 1 by clamping that portion of the inner tube adjacent the nipple opening, between the head 3 and a nut 7 in the usual manner to provide a tight air impervious joint. Threaded portion 5 is that corresponding to the usual threaded portion for receiving the screw cap of the nipple and the portion 6 is adapted to receive the pump connection when the tire is to be inflated.

The head of the nipple 2 partakes of a position within the inner tube and is bifurcated to receive between the legs of such bifurcations one end of an operating arm 8, which is pivoted to such head on a pin 9. The pivoted end of the arm 8 is also bifurcated, and across the forked end thereof extends a pin 10 carrying a link 11, the other end of which is secured to a valve 12. The valve 12 has a suitable facing 13 of rubber or other suitable material and is further provided with a stem 14 which loosely extends into the inner end of an air passage 15 leading through the center of the nipple and terminating in a valve seat 16, against which the valve 12 is adapted to seat.

When the device, as thus far described, is associated with an inner tube and shoe on the wheel of an automobile instead of screwing on to the stem of the nipple the usual screw cap, some suitable form of pneumatically operated alarm is substituted for the screw cap. In the drawings a whistle 17 is employed. If an automobile equipped with this invention is passing along a road and a slow leak develops in one of the tires, the tire will gradually become deflated until it becomes sufficiently soft so that during the rotation of the wheel the inner tube will be caused to press against the arm 8. This pressure will cause the arm to be oscillated in the direction of the arrow with the result that the valve 12 will be drawn away from its seat allowing a small portion of the air to be released through the nipple. In the exit of this air the whistle 7 will be blown and this operation will be repeated each time that that portion of the tire adjacent the nipple comes in contact with the ground with the result that the occupants of the car, hearing the audible alarm, will know that one of the tires is becoming soft and will stop and make the necessary repairs. After making such repairs, the tire is inflated in the usual manner, the pressure of the air introduced into the tire being sufficient to automatically unseat the valve 12, but when the pump connection is released the pressure in the tire will be more than sufficient to hold the valve in its seat.

I am aware that the present invention is adapted to numerous changes in detail of construction and I further wish it understood that the invention is not limited to the specific details shown, but is to be understood as broadly novel as is commensurate with the appended claim:

Having thus fully described the invention, what I claim as new and desire to secure by Letters Patent is:

In a pneumatic tire, a tire nipple provided with a central passage the inner end of which terminates in a valve seat, a valve associated with said seat and provided with a stem projecting into the passage to guide the valve in its operations, spaced lugs on the inner end of the tire nipple, an operating arm pivoted at one end to the spaced lugs, and free at its other end, and a link pivoted to the valve at one end and at its other end to the operating arm intermediate the ends thereof, said arm being curved back to underlie its pivot to enter rearwardly thereof to effect the operation of the valve through a toggle action, whereby the arm is operable when the tire becomes partially deflated through leakage or puncture to unseat the valve and allow air to escape through the passage of the nipple, in combination with an audible alarm associated with the outer end of the nipple and operable by the escaping air.

In testimony whereof, I sign my name to this specification.

HUGO STOMMEL.